US009303555B2

(12) United States Patent
Wu et al.

(10) Patent No.: US 9,303,555 B2
(45) Date of Patent: Apr. 5, 2016

(54) EXHAUST MANIFOLD

(71) Applicant: GM GLOBAL TECHNOLOGY OPERATIONS LLC, Detroit, MI (US)

(72) Inventors: Ko-Jen Wu, Troy, MI (US); Dustin Loveland, Holly, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 171 days.

(21) Appl. No.: 13/856,553

(22) Filed: Apr. 4, 2013

(65) Prior Publication Data

US 2014/0298799 A1 Oct. 9, 2014

(51) Int. Cl.

| | |
|---|---|
| ***F02D 23/00*** | (2006.01) |
| ***F02B 33/44*** | (2006.01) |
| ***F01N 1/00*** | (2006.01) |
| ***F02B 33/00*** | (2006.01) |
| ***F02B 37/12*** | (2006.01) |
| ***F01N 13/10*** | (2010.01) |
| ***F02B 37/00*** | (2006.01) |
| ***F02B 37/02*** | (2006.01) |
| ***F02B 37/18*** | (2006.01) |

(52) U.S. Cl.

CPC ................ *F02B 37/12* (2013.01); *F01N 13/10* (2013.01); *F01N 13/107* (2013.01); *F02B 37/002* (2013.01); *F02B 37/004* (2013.01); *F02B 37/025* (2013.01); *F02B 37/183* (2013.01); *Y02T 10/144* (2013.01)

(58) Field of Classification Search

CPC ..... F01N 13/10; F01N 13/107; Y02T 10/144; F02B 37/025

See application file for complete search history.

(56) References Cited

U.S. PATENT DOCUMENTS

| | | | | |
|---|---|---|---|---|
| 7,302,800 | B2 | 12/2007 | Klingel | |
| 2010/0031905 | A1* | 2/2010 | Schwarz et al. | 123/54.4 |
| 2010/0242473 | A1* | 9/2010 | Nou et al. | 60/612 |
| 2012/0096856 | A1* | 4/2012 | Rutschmann et al. | 60/612 |
| 2015/0075159 | A1* | 3/2015 | Kemmerling | F01D 17/08 60/602 |

FOREIGN PATENT DOCUMENTS

| | | | | |
|---|---|---|---|---|
| DE | 102004036384 | A1 * | 3/2006 | |
| DE | 102005055996 | A1 * | 5/2007 | |
| DE | 102006042443 | A1 * | 3/2008 | |
| DE | 102006042464 | A1 * | 3/2008 | F02B 37/18 |
| DE | 102006047322 | A1 | 4/2008 | |
| DE | 102008049091 | A1 * | 4/2010 | F02B 37/007 |
| DE | 102008055896 | A1 * | 5/2010 | F02B 37/007 |

(Continued)

OTHER PUBLICATIONS

DE 102006042443 A1 English Translation.*

(Continued)

*Primary Examiner* — Thomas Denion
*Assistant Examiner* — Jessica Kebea
(74) *Attorney, Agent, or Firm* — Cantor Colburn LLP

(57) ABSTRACT

An exhaust manifold for at least a portion of an internal combustion engine having a defined number of combustion chambers includes a plurality of inlet ports and four outlet ports. A first pair of the four outlet ports are disposed in gas flow communication with a first subset of the plurality of inlet ports, and a second pair of the four outlet ports different from the first pair are disposed in gas flow communication with a second subset of the plurality of inlet ports different from the first subset.

24 Claims, 8 Drawing Sheets

500 100 102 1 2 3 4 204 252 254 362 256 206 200 360 208 202 260 210 258 304 302 601 306 600 602 604 350 300 402 404 406 400

(56) References Cited

FOREIGN PATENT DOCUMENTS

| | | | | | |
|---|---|---|---|---|---|
| DE | 102009026797 | A1 | | 12/2010 | |
| FR | 2858656 | A1 | * | 2/2005 | ............ F02B 37/013 |
| JP | 03033430 | A | * | 2/1991 | |
| JP | 03151519 | A | * | 6/1991 | ............. F02B 37/00 |
| JP | H06280586 | A | | 4/1994 | |
| JP | 06146908 | A | * | 5/1994 | |
| WO | WO 9618031 | A1 | * | 6/1996 | ............ F02M 25/07 |
| WO | WO 2007035972 | A2 | * | 4/2007 | ............ F01N 13/107 |

OTHER PUBLICATIONS

DE 102008055896A1 English Translation.*

Firing Order NPL Date Mar. 29, 2012.*

"GM 2006 Vortec 3500 3.5L I-5".*

NPL Chevy Firing Order Dec. 19, 2011.*

BMW, BMW Patents Turbo V6 Engine. F80 M3 Application?, Sep. 2011 [retrieved on Nov. 19, 2012]. Retrieved from the internet:,URL:http://www.f30post.com/forums/showthread./php?t=582941.

E. Groff, A. Königstein, and H. Drangel, "The New 2,0L High Performance Turbo Engine with Gasoline Direct Injection from GM Powertrain", 27th International Vienna Motor Symposium, 2006. 31 pages.

Grebe, et al. "Comparison of Charging Systems for Spark Ignition Engines" Vienna paper 2007 grebe.doc. Jan. 15, 2007. 33 pages.

DE Office Action, Issued Jul. 13, 2015, for Appl. No. 102014104402.9, which claims priority to U.S. Appl. No. 13/856,553, filed Apr. 4, 2013, 6 pages.

Chinese Office Action for Application No. 201410134706.7 dated Dec. 29, 2015; 11 pgs.

Chinese agent reporting letter in English dated Jan. 12, 2016 regarding CN Office Action Application No. 201410134706.7 dated Dec. 29, 2015; 2 pgs.

* cited by examiner

EXHAUST MANIFOLD

FIELD OF THE INVENTION

The subject invention relates to exhaust manifolds for an internal combustion engine, and more particularly to exhaust manifolds for an internal combustion engine employing a twin-scroll turbocharger in a two-stage system.

BACKGROUND

With high-performance camshaft timing, the exhaust valves in different cylinders can be opened at the same time, overlapping at the end of the power stroke in one cylinder and the end of exhaust stroke in another. In a single-stage system employing a twin-scroll turbocharger, the exhaust manifold physically separates the channels for cylinders which can interfere with each other, so that the pulsating exhaust gasses flow through separate spirals (scrolls), which allows the engine to efficiently utilize exhaust scavenging techniques, which decreases cylinder gas temperatures and NOx emissions and improves turbine efficiency, reducing turbo lag. However, single-stage turbocharger systems do not provide the performance characteristics of a two-stage turbocharger system.

Accordingly, it is desirable to provide an exhaust manifold for a two-stage turbocharger system employing a twin-scroll turbocharger.

SUMMARY OF THE INVENTION

In one exemplary embodiment of the invention an exhaust manifold for at least a portion of an internal combustion engine having a defined number of combustion chambers includes a plurality of inlet ports and four outlet ports. A first pair of the four outlet ports are disposed in gas flow communication with a first subset of the plurality of inlet ports, and a second pair of the four outlet ports different from the first pair are disposed in gas flow communication with a second subset of the plurality of inlet ports different from the first subset.

In another exemplary embodiment of the invention a bifurcated exhaust manifold for use with a defined number of combustion chambers of an internal combustion engine includes a plurality of inlet ports and two gas flow chambers. A first gas flow chamber is disposed in gas flow communication with a first subset of the plurality of inlet ports, and a second gas flow chamber is disposed in gas flow communication with a second subset of the plurality of inlet ports that is distinct from the first subset. The second gas flow chamber is distinct from the first gas flow chamber, and each gas flow chamber comprises two outlet ports.

In another exemplary embodiment of the invention a combination useful in a vehicle includes an internal combustion engine having a defined number of combustion chambers, an exhaust manifold disposed in gas flow communication with the internal combustion engine, a first turbocharger and a second turbocharger disposed in gas flow communication with the exhaust manifold, and a control valve disposed in gas flow communication between the exhaust manifold and the second turbocharger, and between the first turbocharger and the second turbocharger. The control valve is operable between a closed position that facilitates exhaust gas flow in the exhaust manifold to the first turbocharger, and an open position that facilitates exhaust gas flow in the exhaust manifold to the second turbocharger. The exhaust manifold includes a plurality of inlet ports and four outlet ports. A first pair of the four outlet ports are disposed in gas flow communication with a first subset of the plurality of inlet ports, and a second pair of the four outlet ports different from the first pair are disposed in gas flow communication with a second subset of the plurality of inlet ports different from the first subset.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
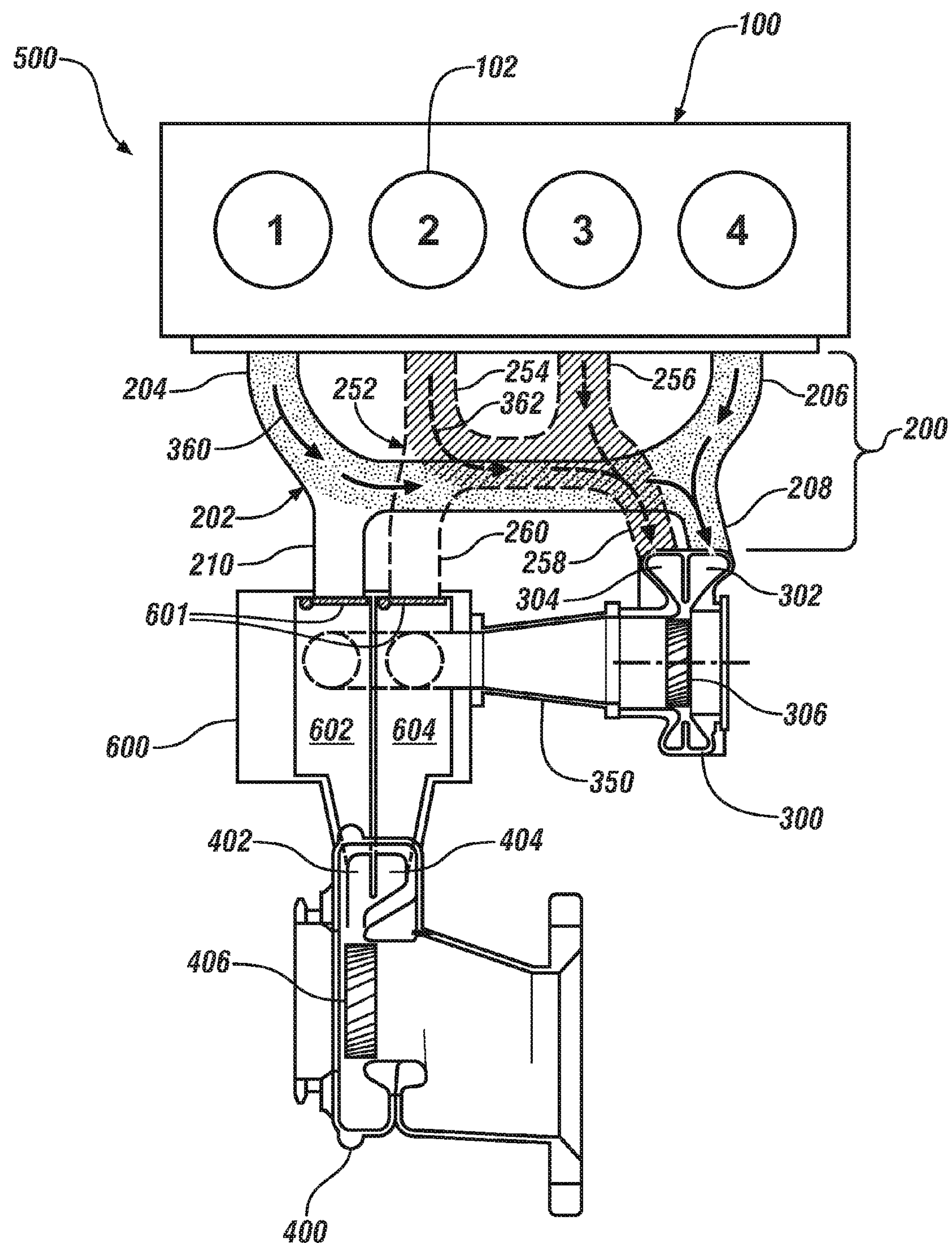
FIG. 1 depicts an exhaust manifold for use with an inline-4 internal combustion engine in a twin-scroll two-stage turbocharger system where exhaust gas flow is directed one way via a closed control valve, in accordance with an embodiment of the invention.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, and with reference to FIG. 1, an internal combustion engine (ICE) 100, an exhaust manifold 200, a first turbocharger 300, and a second turbocharger 400, are depicted in flow communication with each other in a combination 500 that is useful in a vehicle configured to be powered by the ICE 100.

The ICE 100 has a defined number of combustion chambers 102 (also herein referred to as cylinders but not intended to be limited to only a cylindrical geometry), numbered 1, 2, 3 and 4 (and herein respectively referred to as cylinder-1, cylinder-2, cylinder-3 and cylinder-4) in an inline-4 (14) configuration in FIG. 1. While FIG. 1 depicts an ICE 100 having four combustion chambers 102 in an inline configuration, it will be appreciated that the scope of the invention is not limited, and encompasses other numbers of combustion chambers in other arrangements, such as Flat-4 (4 cylinders, with 2 cylinders on each side of a flat configuration), IS (5 cylinders in an inline configuration), Flat-6 (6 cylinders, with 3 cylinders on each side of a flat configuration), 16 (6 cylinders in an inline configuration), V-6 (6 cylinders, with 3 cylinders on each side of a V-shaped configuration), and V-8 (8 cylinders, with 4 cylinders on each side of a V-shaped configuration), for example, which will be discussed in more detail below.

The exhaust manifold 200 is bifurcated into a first gas flow chamber 202, depicted in solid line format, and a second gas flow chamber 252, depicted in dashed line format. The first and second gas flow chambers 202, 252 are distinct from each other to prevent the mixing of gas flows present therein during operation of the ICE 100. The exhaust manifold 200 has a plurality of inlet ports 204, 206, 254, 256 equal in number to the defined number of combustion chambers 102, which equal four in the embodiment of FIG. 1. Inlet ports 204, 206 are associated with the first gas flow chamber 202, and inlet ports 254, 256 are associated with the second gas flow chamber 252. The exhaust manifold 200 has four outlet ports 208, 210, 258, 260, where outlet ports 208, 210 are associated with the first gas flow chamber 202, and outlet ports 258, 260 are associated with the second gas flow chamber 252.

The first turbocharger 300 and the second turbocharger 400 are each disposed in operable communication with the exhaust manifold 200, where a first pair 208, 210 of the four outlet ports are disposed in gas flow communication with the first turbocharger 300 and the second turbocharger 400, and where a second pair 258, 260 of the four outlet ports are disposed in gas flow communication with the first turbocharger 300 and the second turbocharger 400. More specifically, outlet ports 208 and 258 are both disposed in gas flow communication with the first turbocharger 300, and outlet ports 210 and 260 are disposed in gas flow communication with the second turbocharger 400. It will be appreciated that the first pair 208, 210 of the four outlet ports, which are associated with the first gas flow chamber 202, are distinct from the second pair 258, 260 of the four outlet ports, which are associated with the second gas flow chamber 252, which serves to prevent the mixing of gas flows present therein during operation of the ICE 100.

A first subset 204, 206 of the plurality of inlet ports is disposed in gas flow communication with a first subset, cylinder-1 and cylinder-4, of the defined number of combustion chambers 102, and is disposed in gas flow communication with the first turbocharger 300 and the second turbocharger 400 via the first pair 208, 210 of the four outlet ports.

A second subset 254, 256 of the plurality of inlet ports is disposed in gas flow communication with a second subset, cylinder-2 and cylinder-3, of the defined number of combustion chambers 102, and is disposed in gas flow communication with the first turbocharger 300 and the second turbocharger 400 via the second pair 258, 260 of the four outlet ports.

It will be appreciated from the foregoing that the first subset 204, 206 of the plurality of inlet ports are distinct from the second subset 254, 256 of the plurality of inlet ports to prevent the mixing of gas flows present therein during operation of the ICE 100. It will also be appreciated from the foregoing that the first subset, cylinder-1 and cylinder-4, of the defined number of combustion chambers 102 are distinct from the second subset, cylinder-2 and cylinder-3, of the defined number of combustion chambers 102, such that there is a one-to-one relationship between the plurality of combustion chambers 102 and the plurality of inlet ports 204, 206, 254, 256.

It will be appreciated from the foregoing that the first subset 204, 206 of the plurality of inlet ports and the first pair 208, 210 of the four outlet ports define a first gas flow chamber 202, and that the second subset 254, 256 of the plurality of inlet ports and the second pair 258, 260 of the four outlet ports define a second gas flow chamber 252.

Figure 2:
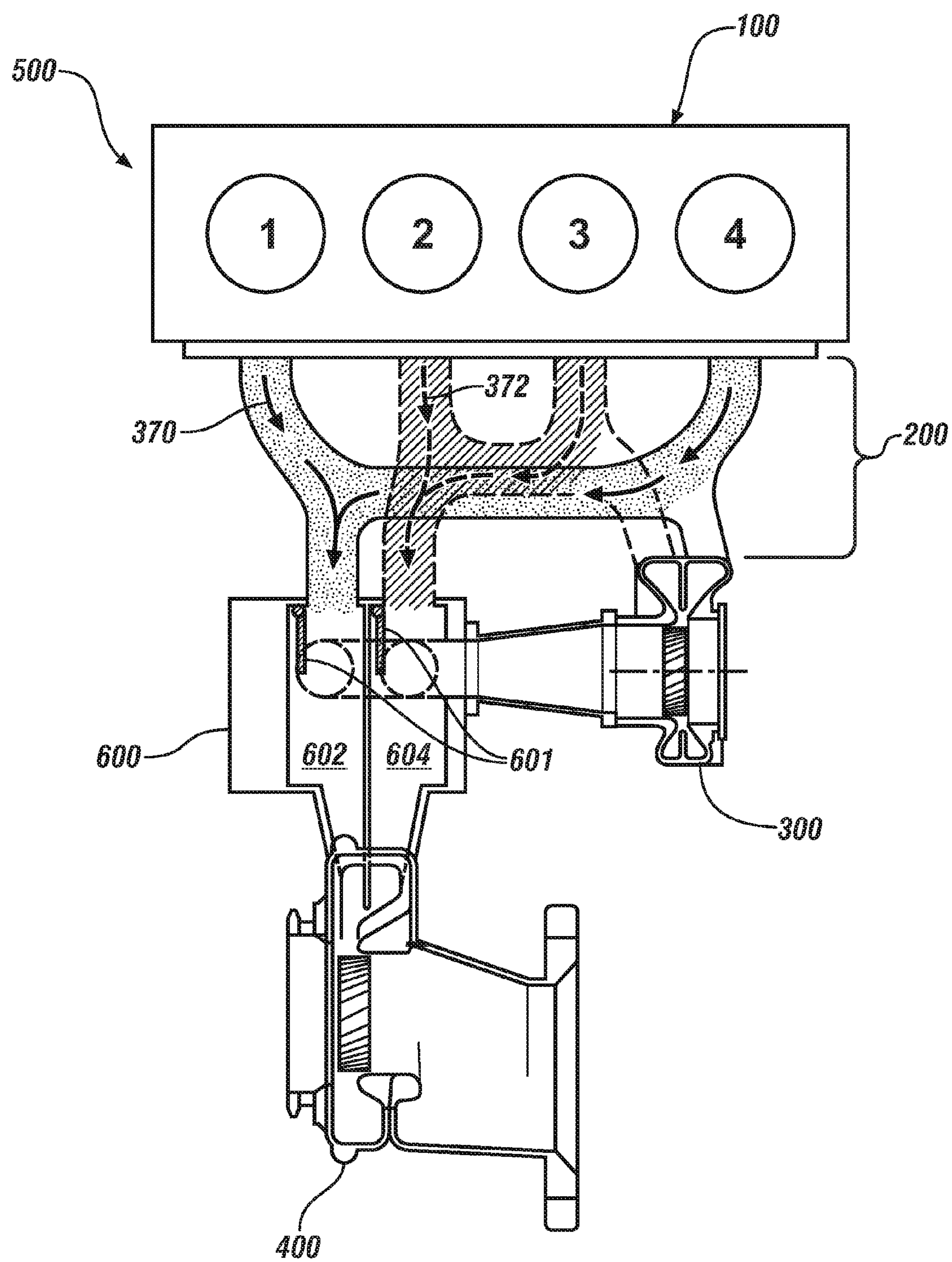
FIG. 2 depicts the exhaust manifold of FIG. 1 for use with an inline-4 internal combustion engine in a twin-scroll two-stage turbocharger system where exhaust gas flow is directed another way via an open control valve, in accordance with an embodiment of the invention.

A control valve 600 is disposed in gas flow communication between the exhaust manifold 200 and the second turbocharger 400. More specifically, the control valve 600 is disposed in gas flow communication between outlet ports 210, 260 and the second turbocharger 400, where outlet port 210 is associated with the first gas flow chamber 202, and outlet port 260 is associated with the second gas flow chamber 252. The control valve 600 is operable between a closed position, as depicted in FIG. 1 with valve seals 601 closed, that facilitates exhaust gas flow from the ICE 100 to the first turbocharger 300 as indicated by flow lines 360 and 362, and an open position, as depicted in FIG. 2 with valve seals 601 open, that facilitates exhaust gas flow from the ICE 100 to the second turbocharger 400 as indicated by flow lines 370 and 372. Like elements between FIGS. 1 and 2 are herein referred to by reference to the reference numerals provided in FIG. 1 if not differently enumerated.

It is known in the art that turbochargers are available in a single-scroll configuration or a twin-scroll configuration, where the term twin-scroll refers to the presence of two exhaust gas inlets and two nozzles on a single turbocharger. The two exhaust gas inlets and two nozzles create separate spirals (scrolls) through which the exhaust gasses flow.

With reference to FIGS. 1-7, the control valves 600 are structurally configured for providing gas flow to a second turbocharger 400 that is a twin-scroll turbocharger, where the control valve 600 has a body with two separate flow passages 602, 604 connecting the outlet ports 210, 260 of the exhaust manifold 200 to the twin-scroll second turbocharger 400.

Figure 8:
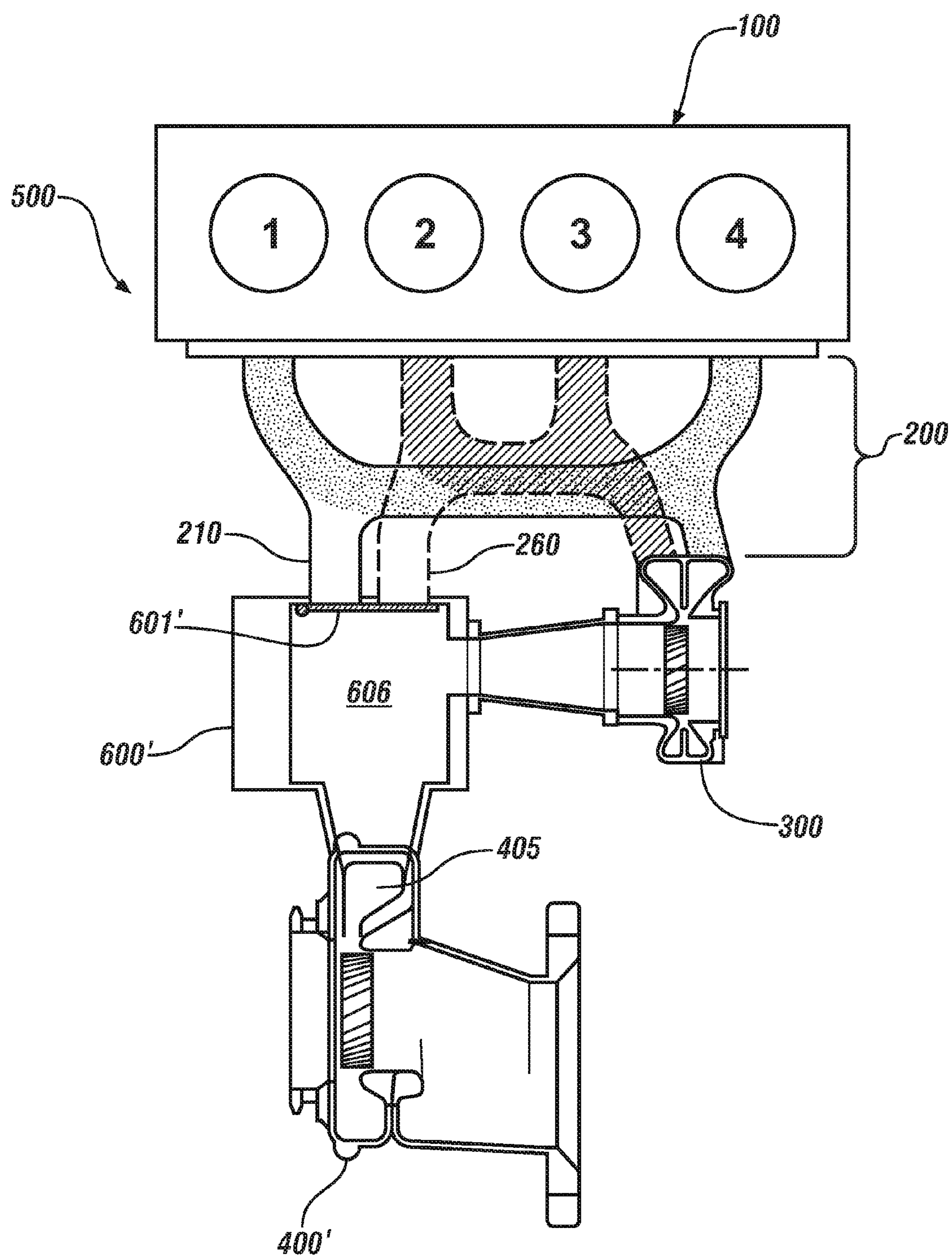
FIG. 8 depicts the exhaust manifold of FIG. 1 where the second twin-scroll turbocharger has been replaced with a single-scroll turbocharger, in accordance with an embodiment of the invention.

With reference to FIG. 8, the control valve 600' is structurally configured for providing gas flow to a second turbocharger 400' that is a single-scroll turbocharger, where the control valve 600' has a body with a single flow passage 606 connecting the outlet ports 210, 260 of the exhaust manifold 200 to the single-scroll second turbocharger 400'. FIG. 8 depicts the control valve 600' with a valve seal 601' in a closed position, similar to the control valve 600 and valve seals 601 depicted in FIG. 1.

While embodiments of the invention are described herein having an exhaust manifold 200 connected to a control valve 600 with two separate flow passages 602, 604 for connecting to a twin-scroll second turbocharger 400, as depicted in FIGS. 1-7, it will be appreciated that the scope of the invention is not so limited and also encompasses an exhaust manifold 200 that can be connected to a control valve 600' with a single flow passage 606 for connecting to a single-scroll second turbocharger 400', as depicted in FIG. 8.

In an embodiment of the invention, and with reference still to FIG. 1, the first turbocharger 300 is a first twin-scroll turbocharger having a first inlet port 302 and a second inlet port 304 that are both disposed in gas flow communication with a first turbine wheel 306 disposed within the first turbocharger 300, and the second turbocharger 400 is either a single-scroll turbocharger or a second twin-scroll turbocharger. In an embodiment, the second turbocharger 400 is a second twin-scroll turbocharger having a third inlet port 402 and a fourth inlet port 404 that are both disposed in gas flow communication with a second turbine wheel 406 disposed within the second turbocharger 400. Outlet port 208 (also herein referred to as a first outlet port) of the first pair 208, 210 of outlet ports is disposed in gas flow communication with the first inlet port 302 of the first twin-scroll turbocharger 300. Outlet port 210 (also herein referred to as a second outlet port) of the first pair 208, 210 of outlet ports is disposed in gas flow communication with the third inlet port 402 of the second twin-scroll turbocharger 400. Outlet port 258 (also herein referred to as a third outlet port) of the second pair 258, 260 of outlet ports is disposed in gas flow communication with the second inlet port 304 of the first twin-scroll turbocharger 300. And, outlet port 260 (also herein referred to as a fourth outlet port) of the second pair 258, 260 of outlet ports is disposed in gas flow communication with the fourth inlet port 404 of the second twin-scroll turbocharger 400.

In another embodiment, and with reference briefly to FIG. 8, the second turbocharger 400' is a single-scroll turbocharger where the aforementioned third and fourth inlet ports 402, 404 are replaced by a single inlet port 405.

During operation of the ICE 100, cylinders 1, 2, 3 and 4 fire in a particular sequence. In an embodiment the 14 cylinders depicted in FIG. 1 are disposed in a 1-2-3-4 inline configuration and have a 1-3-4-2 firing sequence. As such, it will be appreciated that inlet ports 204 and 206 of the first gas flow chamber 202 do not see exhaust flows from consecutive firings, and inlet ports 254 and 256 of the second gas flow chamber 252 do not see exhaust flows from consecutive firings. In other words, inlet ports 204 and 206 of the first gas flow chamber 202 are disposed in gas flow communication with respective ones of the four combustion chambers 102, namely cylinder-1 and cylinder-4, having a one-off firing sequence, i.e., non-sequential firing sequence, and inlet ports 254 and 256 of the second gas flow chamber 252 are disposed in gas flow communication with respective ones of the four combustion chambers 102, namely cylinder-2 and cylinder-3, having a one-off firing sequence.

In an embodiment, the first turbocharger 300 is a high-pressure turbocharger and the second turbocharger 400 is a low-pressure turbocharger, where the first turbocharger 300 is configured and disposed to feed exhaust gas to the second turbocharger 400 via flow passage 350 to form a compound turbocharging system where the first and second turbochargers 300, 400 work in series with each other. The first (high-pressure) turbocharger 300 is responsible for generating quick turbo response and rapid air flow from idle or near idle through a low engine speed range, and the second (low-pressure) turbocharger 400 is responsible for high output as the engine speed builds up. When the control valve 600 is in the closed position, as depicted in FIG. 1, exhaust gas flow from the ICE 100 is directed to the first (high-pressure) turbocharger 300 for quick response at a low engine speed range, and then to the second (low-pressure) turbocharger 400 via flow passage 350. At the low engine speed range only the first turbocharger 300 is effective. When the control valve 600 is in the open position, as depicted in FIG. 2, exhaust gas flow from the ICE 100 is directed to the second (low-pressure) turbocharger 400 for high output at a high engine speed range. At the high engine speed range only the second turbocharger is effective. When the control valve 600 is in an intermediate position between the closed and open positions, exhaust gas flow from the ICE 100 is directed to both turbochargers 300, 400. In an embodiment, the low engine speed range is on the order of idle speed-1800 RPM (revolutions per minute), and the high engine speed range is on the order of greater than about 3000 RPM. Between about 1800-3000 RPM, both turbochargers 300, 400 are effective.

In one embodiment, the first and second gas flow chambers 202, 252 of the exhaust manifold 200 are formed as two separate housings that are separate and distinct from each other such that one gas flow chamber can be assembled to the ICE 100 independent of the other. In another embodiment, the first and second gas flow chambers 202, 252 of the exhaust manifold 200 are formed as an integral housing having two separate and distinct internal flow paths that are conjoined with each other such that both gas flow chambers can be assembled to the ICE 100 together.

While the foregoing description with reference to FIGS. 1 and 2 has been directed to a turbocharger system usable on a four-cylinder ICE 100, it will be appreciated that the scope of the invention is not so limited and encompasses other engine configurations, such as an inline five cylinder configuration (IS), an inline six cylinder configuration (16), a six cylinder configuration having three cylinders opposing three other cylinders (referred to as a V-6), and an eight cylinder configuration having four cylinders opposing four cylinder (referred to as a V-8), which will now be discussed in connection with FIGS. 3-7, where like elements are numbered alike, and similar elements are numbered with decimals. And while not specifically illustrated herein, embodiments of the invention having a different cylinder count, such as ten or twelve cylinders, for example, are considered within the scope of the invention.

Figure 3:
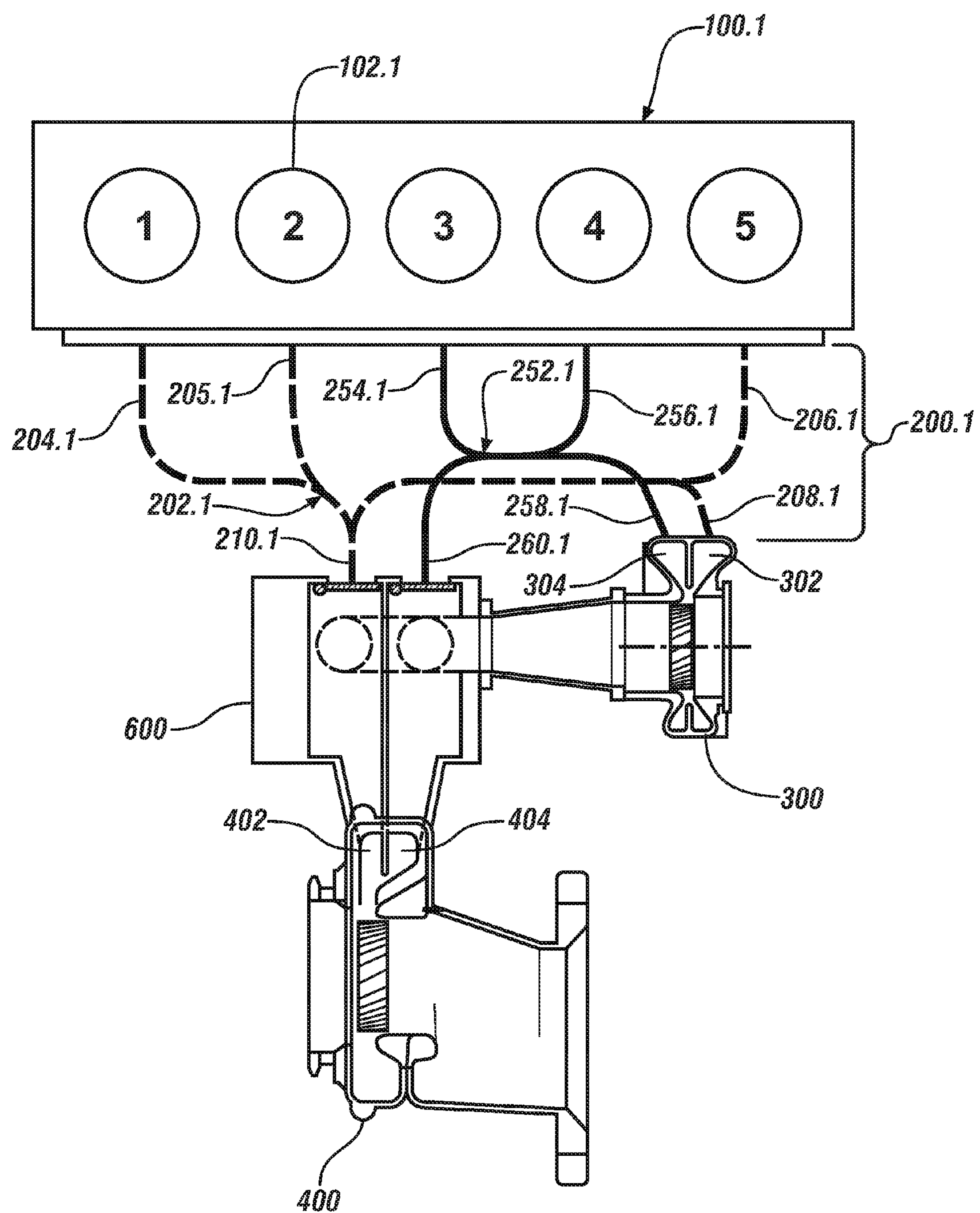
FIG. 3 depicts an exhaust manifold for use with an inline-5 internal combustion engine in a twin-scroll two-stage turbocharger system with a closed control valve, in accordance with an embodiment of the invention.

FIG. 3 depicts an internal combustion engine (ICE) 100.1, an exhaust manifold 200.1 (depicted in single-line format), a first turbocharger 300, a second turbocharger 400, and a control valve 600, similar to that depicted in FIG. 1, but where the ICE 100.1 is an IS engine having a combustion chamber 102.1 with five cylinders disposed in a 1-2-3-4-5 inline configuration and having a firing sequence of 1-3-5-4-2, and where the exhaust manifold 200.1 is configured to mate with the IS ICE 100.1. In an embodiment, cylinders-1, 2 and 5 form a first group, and cylinders-3 and 4 form a second group, where the first group are operated with about a 144-degree crank angle or about a 288-degree crank angle between consecutive exhaust events, and the second group are operated with about a 288-degree crank angle or about a 432-degree crank angle between consecutive exhaust events. The crank angle refers to the rotational position of the crankshaft, which is an indication of the position of each piston. The above crank angle durations are based on a crankshaft design which would yield evenly spaced firing sequence of the cylinders of a four-stroke engine. Exhaust manifold 200.1 has a first gas flow chamber 202.1 and a second gas flow chamber 252.1. The first gas flow chamber 202.1 has a plurality of inlet ports 204.1, 205.1 and 206.1 disposed in gas flow communication with cylinders-1, 2 and 5, respectively, and two outlet ports 208.1 and 210.1 respectively disposed in gas flow communication, via the control valve 600, with the first inlet port 302 of the first turbocharger 300 and the third inlet port 402 of the second turbocharger 400. The second gas flow chamber 252.1 has a plurality of inlet ports 254.1 and 256.1 disposed in gas flow communication with cylinders-3 and 4, respectively, and two outlet port 258.1 and 260.1 respectively disposed in gas flow communication, via the control valve 600, with the second inlet port 304 of the first turbocharger 300 and the fourth inlet port 404 of the second turbocharger 400. With the firing sequence of the embodiment of FIG. 3 being 1-3-5-4-2, it can be readily seen that the first, the second and the third inlet ports 204.1, 205.1 and 206.1 are disposed in gas flow communication with respective ones of the five combustion chambers, namely cylinders-1, 2 and 5, having a one-off firing sequence, and that the fourth and the fifth inlet ports 254.1, 256.1 are disposed in gas flow communication with respective other ones of the five combustion chambers, namely cylinders-3 and 4, having a one-off firing sequence. Further operation of the turbocharging system of FIG. 3, including first and second turbochargers 300, 400 and control valve 600, is in accordance with the description above directed to FIGS. 1 and 2.

Figure 4:
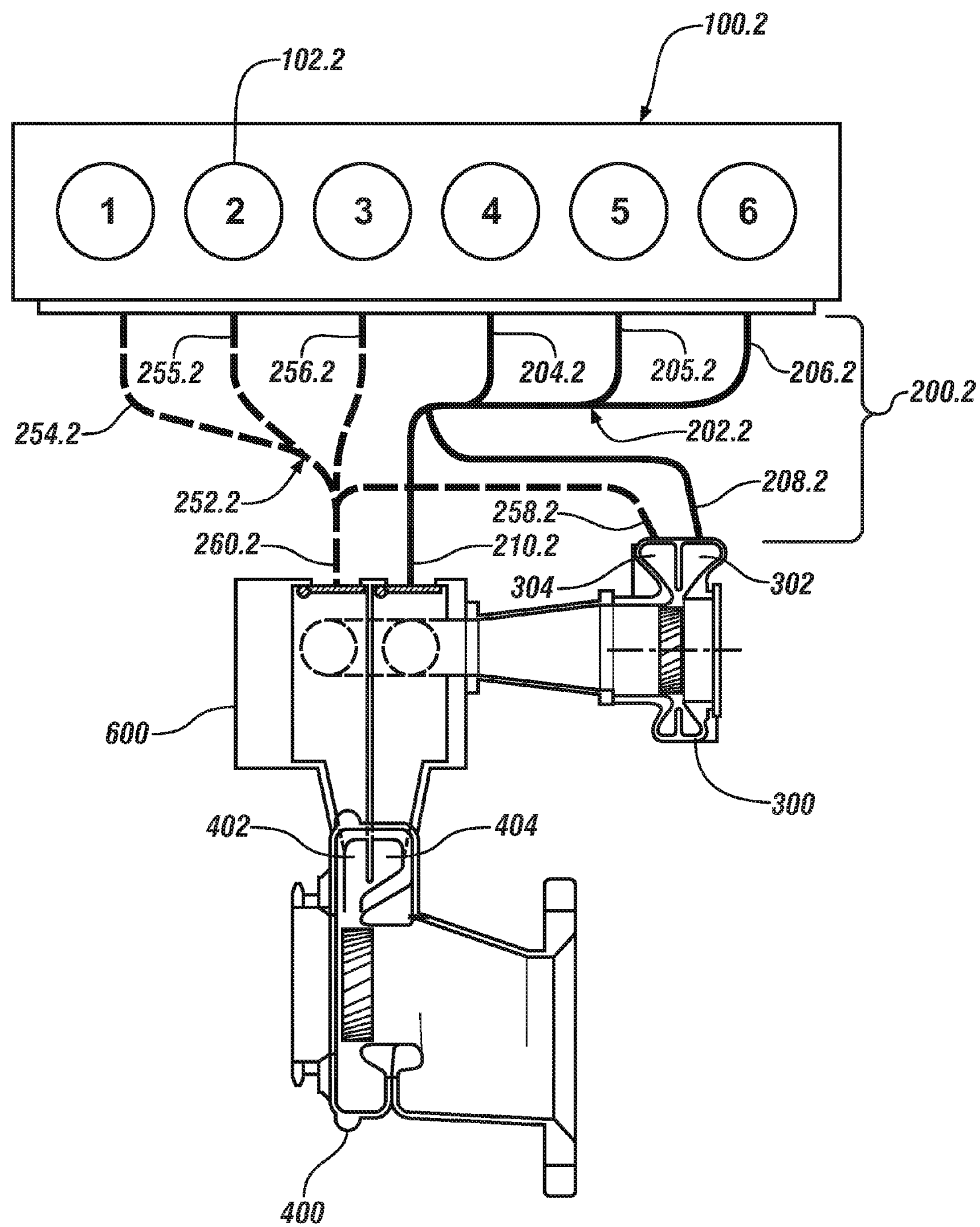
FIG. 4 depicts an exhaust manifold for use with an inline-6 internal combustion engine in a twin-scroll two-stage turbocharger system with a closed control valve, in accordance with an embodiment of the invention.

FIG. 4 depicts an internal combustion engine (ICE) 100.2, an exhaust manifold 200.2 (depicted in single-line format), a first turbocharger 300, a second turbocharger 400, and a control valve 600, similar to that depicted in FIG. 1, but where the ICE 100.2 is an 16 engine having a combustion chamber 102.2 with six cylinders disposed in a 1 2 3 4 5 6 inline configuration and having a firing sequence of 1 5 3 6 2 4, and where the exhaust manifold 200.2 is configured to mate with the 16 ICE 100.2. In an embodiment, the six cylinders operate with a 240-degree crank angle between consecutive exhaust events. Exhaust manifold 200.2 has a first gas flow chamber 202.2 and a second gas flow chamber 252.2. The first gas flow chamber 202.2 has a plurality of inlet ports 204.2, 205.2 and 206.2 disposed in gas flow communication with cylinders-4, 5 and 6, respectively, and two outlet ports 208.2 and 210.2 respectively disposed in gas flow communication, via the control valve 600, with the first inlet port 302 of the first turbocharger 300 and the third inlet port 404 of the second turbocharger 400. The second gas flow chamber 252.2 has a plurality of inlet ports 254.2, 255.2 and 256.2 disposed in gas flow communication with cylinders-1, 2 and 3, respectively, and two outlet port 258.2 and 260.2 respectively disposed in gas flow communication, via the control valve 600, with the second inlet port 304 of the first turbocharger 300 and the fourth inlet port 402 of the second turbocharger 400. With the firing sequence of the embodiment of FIG. 4 being 1-5-3-6-2-4, it can be readily seen that the first, second and third inlet ports 204.2, 205.2 and 206.2 are disposed in gas flow communication with respective ones of the six combustion chambers, namely cylinders-4, 5 and 6, having a one-off firing sequence, and that the fourth, fifth and sixth inlet ports 254.2, 255.2 and 256.2 are disposed in gas flow communication with respective other ones of the six combustion chambers, namely cylinders-1, 2 and 3, having a one-off firing sequence. Further operation of the turbocharging system of FIG. 4, including first and second turbochargers 300, 400 and control valve 600, is in accordance with the description above directed to FIGS. 1 and 2.

Figure 5:
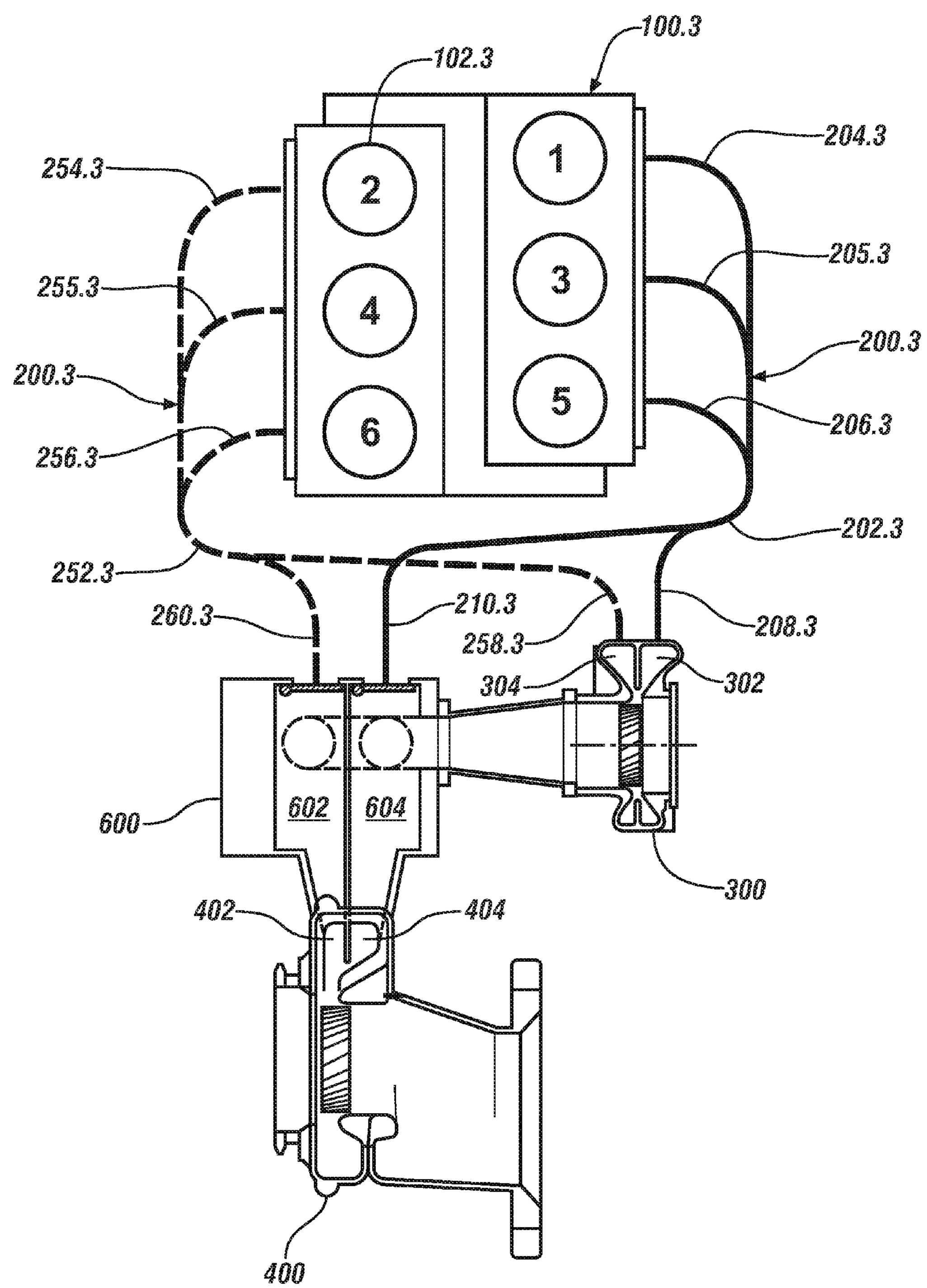
FIG. 5 depicts an exhaust manifold for use with a V-6 internal combustion engine in a twin-scroll two-stage turbocharger system with a closed control valve, in accordance with an embodiment of the invention.

FIG. 5 depicts an internal combustion engine (ICE) 100.3, an exhaust manifold 200.3 (depicted in single-line format), a first turbocharger 300, a second turbocharger 400, and a control valve 600, similar to that depicted in FIG. 1, but where the ICE 100.3 is a V-6 engine having a combustion chamber 102.3 with six cylinders disposed in a V configuration with cylinders 1-3-5 opposing cylinders 2-4-6, respectively, and having a firing sequence of 1-2-3-4-5-6, and where the exhaust manifold 200.3 is configured to mate with the V-6 ICE 100.3. In an embodiment, the six cylinders operate with a 240-degree crank angle between consecutive exhaust events. Exhaust manifold 200.3 has a first gas flow chamber 202.3 and a second gas flow chamber 252.3. The first gas flow chamber 202.3 has a plurality of inlet ports 204.3, 205.3 and 206.3 disposed in gas flow communication with cylinders-1, 3 and 5, respectively, and two outlet ports 208.3 and 210.3 respectively disposed in gas flow communication, via the control valve 600, with the first inlet port 302 of the first turbocharger 300 and the third inlet port 404 of the second turbocharger 400. The second gas flow chamber 252.3 has a plurality of inlet ports 254.3, 255.3 and 256.3 disposed in gas flow communication with cylinders-2, 4 and 6, respectively, and two outlet ports 258.3 and 260.3 respectively disposed in gas flow communication, via the control valve 600, with the second inlet port 304 of the first turbocharger 300 and the fourth inlet port 402 of the second turbocharger 400. With the firing sequence of the embodiment of FIG. 5 being 1-2-3-4-5-6, it can be readily seen that the first, second and third inlet ports 204.3, 205.3 and 206.3 are disposed in gas flow communication with respective ones of the six combustion chambers, namely cylinders-1, 3 and 5, having a one-off firing sequence, and that the fourth, fifth and sixth inlet ports 254.3, 255.3 and 256.3 are disposed in gas flow communication with respective other ones of the six combustion chambers, namely cylinders-2, 4 and 6, having a one-off firing sequence. Further operation of the turbocharging system of FIG. 5, including first and second turbochargers 300, 400 and control valve 600, is in accordance with the description above directed to FIGS. 1 and 2.

Figure 6:
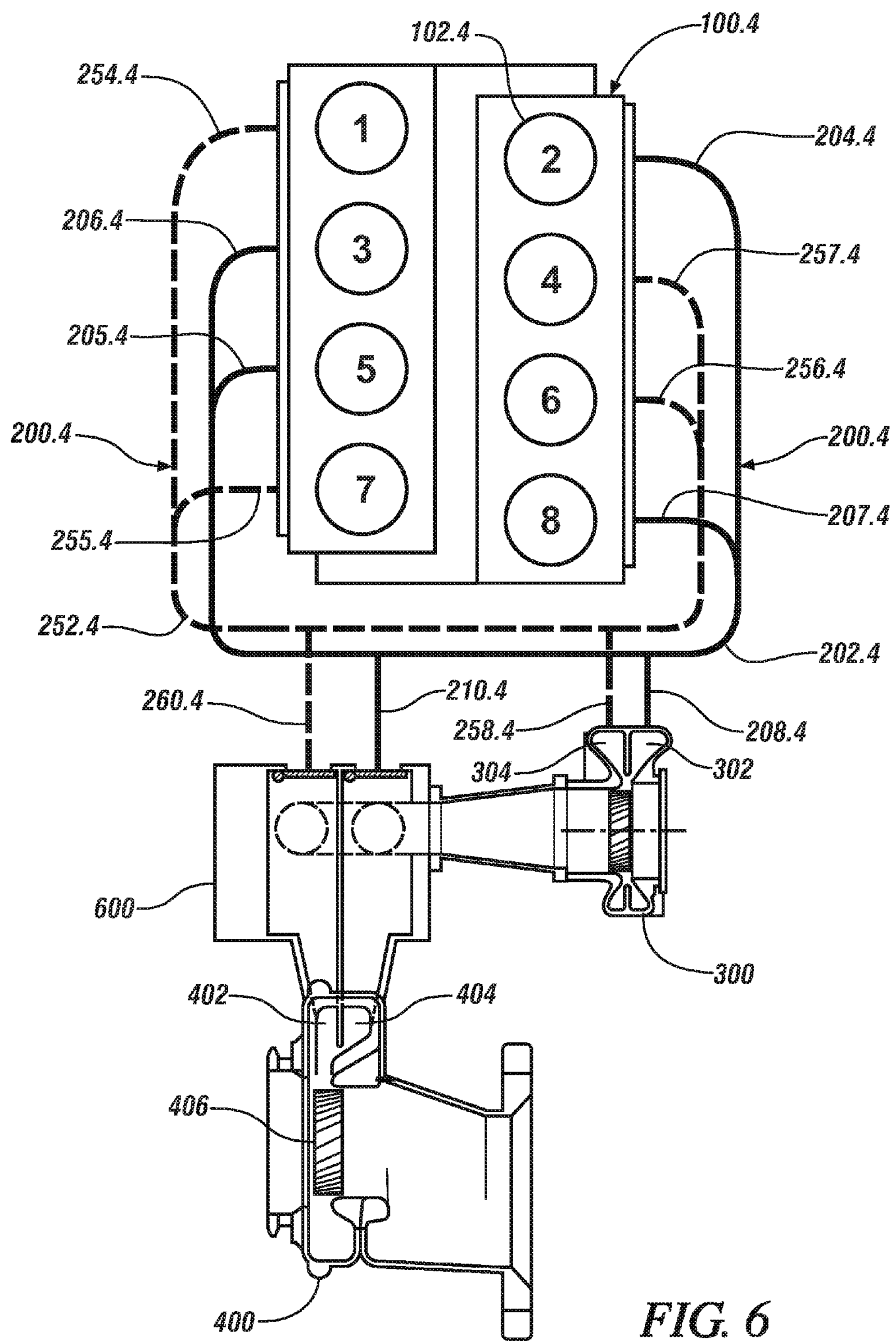
FIG. 6 depicts an exhaust manifold for use with a V-8 internal combustion engine in a twin-scroll two-stage turbocharger system with a closed control valve, in accordance with an embodiment of the invention.

FIG. 6 depicts an internal combustion engine (ICE) 100.4, an exhaust manifold 200.4 (depicted in single-line format), a first turbocharger 300, a second turbocharger 400, and a control valve 600, similar to that depicted in FIG. 1, but where the ICE 100.4 is a V-8 engine having a combustion chamber 102.4 with eight cylinders disposed in a V configuration with cylinders 1-3-5-7 opposing cylinders 2-4-6-8, respectively, and having a firing sequence of 1-8-7-2-6-5-4-3, where the exhaust manifold 200.4 is configured to mate with the V-8 ICE 100.4, and where the eight cylinders operate with a 180-degree crank angle between consecutive exhaust events. Exhaust manifold 200.4 has a first gas flow chamber 202.4 and a second gas flow chamber 252.4. The first gas flow chamber 202.4 has a plurality of inlet ports 204.4, 205.4, 206.4 and 207.4 disposed in gas flow communication with cylinders-2, 5, 3 and 8, respectively, and two outlet ports 208.4 and 210.4 respectively disposed in gas flow communication, via the control valve 600, with the first inlet port 302 of the first turbocharger 300 and the third inlet port 404 of the second turbocharger 400. The second gas flow chamber 252.4 has a plurality of inlet ports 254.4, 255.4, 256.4 and 257.4 disposed in gas flow communication with cylinders-1, 7, 6 and 4, respectively, and two outlet port 258.4 and 260.4 respectively disposed in gas flow communication, via the control valve 600, with the second inlet port 304 of the first turbocharger 300 and the fourth inlet port 402 of the second turbocharger 400. With the firing sequence of the embodiment of FIG. 6 being 1-8-7-2-6-5-4-3, it can be readily seen that the first, second, third and fourth inlet ports 204.4, 205.4, 206.4 and 207.4 are disposed in gas flow communication with respective ones of the eight combustion chambers, namely cylinders-2, 5, 3 and 8, having a one-off firing sequence, and that the fifth, sixth, seventh and eighth inlet ports 254.4, 255.4, 256.4 and 257.4 are disposed in gas flow communication with respective other ones of the eight combustion chambers, namely cylinders-1, 7, 6 and 4, having a one-off firing sequence. Further operation of the turbocharging system of FIG. 6, including first and second turbochargers 300, 400 and control valve 600, is in accordance with the description above directed to FIGS. 1 and 2. While embodiments are described herein employing a V-8 ICE having a firing sequence of 1-8-7-2-6-5-4-3, it will be appreciated that another firing sequence such as 1-8-4-3-6-5-7-2 may be utilized without detracting from the scope of the invention.

Figure 7:
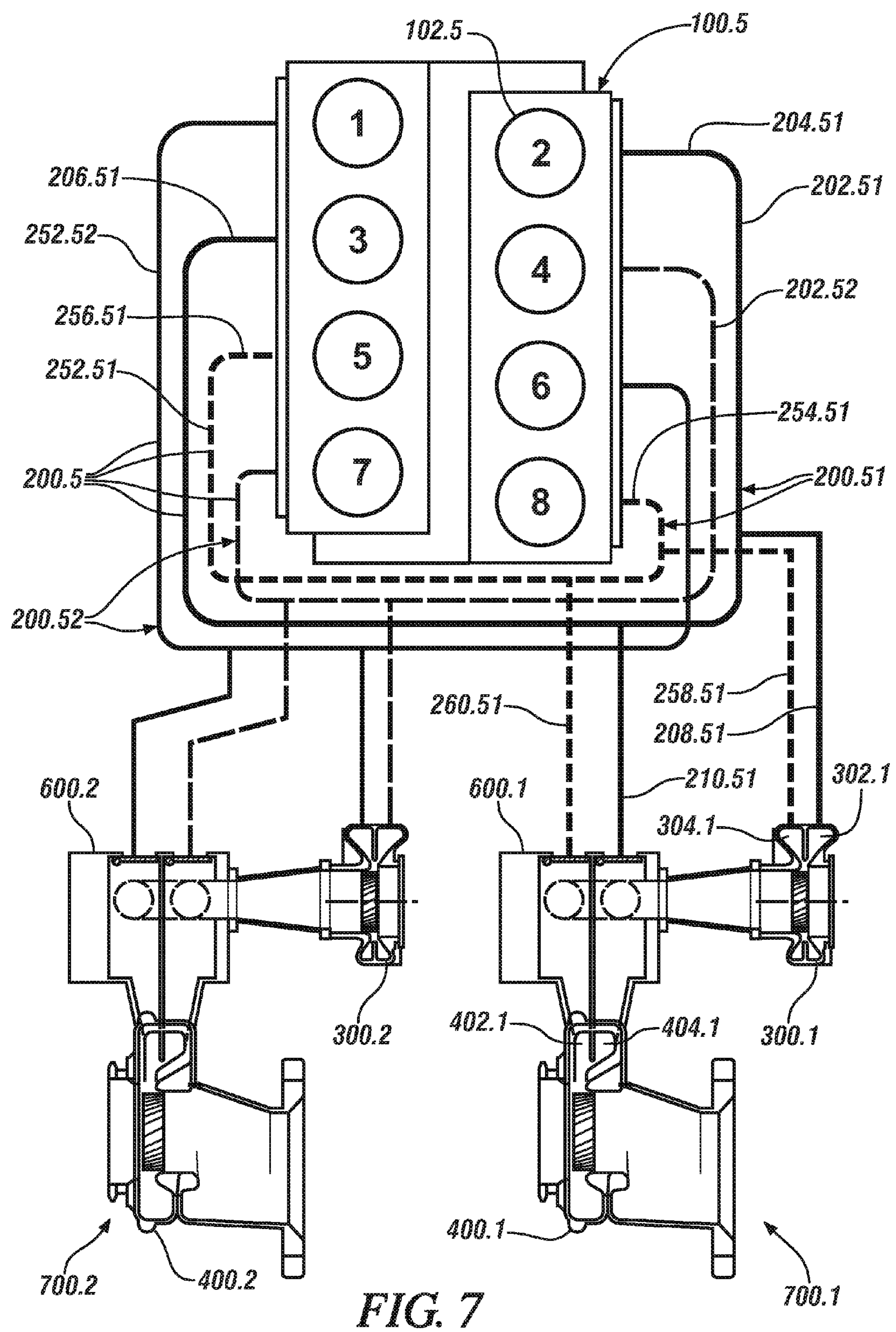
FIG. 7 depicts another exhaust manifold for use with another V-8 internal combustion engine in a twin-scroll two-stage turbocharger system with a closed control valve, in accordance with an embodiment of the invention.

FIG. 7 depicts an internal combustion engine (ICE) 100.5 having two sets of turbochargers 700.1 and 700.2 disposed in gas flow communication with a V-8 engine via an exhaust manifold 200.5 (depicted in single-line format). The V-8 engine has a combustion chamber 102.5 with eight cylinders disposed in a V configuration with cylinders 1-3-5-7 opposing cylinders 2-4-6-8, respectively, and having a firing sequence of 1-8-7-2-6-5-4-3, where the exhaust manifold 200.5 is configured to mate with the V-8 ICE 100.5, where the eight cylinders operate with a 360-degree crank angle between consecutive exhaust events, where the first turbocharger system 700.1 is disposed in gas flow communication with four of the eight cylinders, namely cylinders-5, 8, 2 and 3 via a first exhaust manifold portion 200.51, and where the second turbocharger system 700.2 is disposed in gas flow communication with the other four of the eight cylinders, namely cylinders-1, 6, 4 and 7 via a second exhaust manifold portion 200.52. Accordingly, and in accordance with an embodiment of the invention, a turbocharged V-8 engine having its eight cylinders operate with a 360-degree crank angle between consecutive exhaust events includes two sets of turbochargers with each set servicing four of the eight cylinders, or half of the engine. As such, a description of the first exhaust manifold portion 200.51 as it relates to one half of the engine 100.5, namely cylinders-5, 8, 2 and 3, may also be used to describe the second exhaust manifold portion 200.52 as it relates to the other half of the engine 100.5, namely cylinders-1, 6, 4 and 7.

Reference is now made to the first exhaust manifold portion 200.51 of FIG. 7, recognizing from the foregoing description that a similar arrangement exists for the second exhaust manifold portion 200.52, with appropriate substitution of like or similar reference numeral.

In an embodiment, the first exhaust manifold portion 200.51 has a first gas flow chamber 202.51 and a second gas flow chamber 252.51. The first gas flow chamber 202.51 has a plurality of inlet ports 204.51 and 206.51 disposed in gas flow communication with cylinders-2 and 3, respectively, and two outlet ports 208.51 and 210.51 respectively disposed in gas flow communication, via the first control valve 600.1, with the first inlet port 302.1 of the first turbocharger 300.1 and the third inlet port 404.1 of the second turbocharger 400.1. The second gas flow chamber 252.51 has a plurality of inlet ports 254.51 and 256.51 disposed in gas flow communication with cylinders-8 and 5, respectively, and two outlet port 258.51 and 260.51 respectively disposed in gas flow communication, via the first control valve 600.1, with the second inlet port 304.1 of the first turbocharger 300.1 and the fourth inlet port 402.1 of the second turbocharger 400.1. With the firing sequence of the embodiment of FIG. 7 being 1-8-7-2-6-5-4-3, it can be readily seen that the first, second, third and fourth inlet ports 204.51, 206.51, 254.51 and 256.51 are disposed in gas flow communication with respective ones of the eight combustion chambers, namely cylinders-2, 3, 8 and 5, having a one-off firing sequence. Further operation of the turbocharging system of FIG. 7, including first and second turbochargers 300.1, 400.1 and first control valve 600.1, is in accordance with the description above directed to FIGS. 1 and 2.

From the foregoing, it will be appreciated that a similar arrangement and description applies to the second exhaust manifold portion 200.52 having a first gas flow chamber 202.52 disposed in gas flow communication between cylinders-4 and 7 and turbochargers 300.2 and 400.2 (via valve 600.2), and a second gas flow chamber 252.52 disposed in gas flow communication between cylinders-1 and 6 and turbochargers 300.2 and 400.2 (via valve 600.2). In view of the foregoing, the 2-5-3-8 cylinder arrangement is considered to be a first four-cylinder portion, and the 1-7-6-4 cylinder arrangement is considered to be a second four-cylinder portion, of the V-8 ICE 100.5 of FIG. 7.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust manifold including a control valve for at least a portion of an internal combustion engine having a defined number of combustion chambers;

the exhaust manifold comprising:

a plurality of inlet ports; and four outlet ports, wherein a first pair of the four outlet ports are disposed in gas flow communication with a first subset of the plurality of inlet ports, and wherein a second pair of the four outlet ports different from the first pair are disposed in gas flow communication with a second subset of the plurality of inlet ports different from the first subset;

the control valve comprising:

at least a one seal configured and disposed to selectively receive or not receive exhaust flow from one of the first pair and from one of the second pair of the four outlet ports;

a flow passage inlet disposed to receive exhaust flow from another of the first pair and from another of the second pair of the four outlet ports via exhaust flow from a first turbine wheel; and at least a first flow passage outlet disposed and adapted to feed the exhaust flow received from the at least one seal, the flow passage inlet, or both the at least one seal and the flow passage inlet, to a second turbine wheel.

2. The exhaust manifold including a control valve of claim 1 wherein the internal combustion engine is operable with a first turbocharger including the first turbine wheel and a second turbocharger including the second turbine wheel, and further wherein:

the first pair of the four outlet ports are disposed in gas flow communication with the first turbocharger and the second turbocharger;

the second pair of the four outlet ports are disposed in gas flow communication with the first turbocharger and the second turbocharger; and the first pair of the four outlet ports are distinct from the second pair of the four outlet ports.

3. The exhaust manifold including a control valve of claim 2 wherein:

the first subset of the plurality of inlet ports is disposed in gas flow communication with a first subset of the defined number of combustion chambers, and is disposed in gas flow communication with the first turbocharger and the second turbocharger via the first pair of the four outlet ports;

the second subset of the plurality of inlet ports is disposed in gas flow communication with a second subset of the defined number of combustion chambers, and is disposed in gas flow communication with the first turbocharger and the second turbocharger via the second pair of the four outlet ports;

the first subset of the plurality of inlet ports are distinct from the second subset of the plurality of inlet ports; and the first subset of the defined number of combustion chambers are distinct from the second subset of the defined number of combustion chambers.

4. The exhaust manifold including a control valve of claim 3, wherein the first turbocharger is a twin-scroll turbocharger having a first inlet port and a second inlet port that are both disposed in gas flow communication with a the first turbine wheel, wherein the second turbocharger is a single-scroll turbocharger having a third inlet port that is disposed in gas flow communication with the second turbine wheel, and further wherein:

a first outlet port of the first pair of the four outlet ports is disposed in gas flow communication with the first inlet port of the twin-scroll turbocharger;

a second outlet port of the first pair of the four outlet ports is disposed in gas flow communication with the third inlet port of the single-scroll turbocharger;

a third outlet port of the second pair of the four outlet ports is disposed in gas flow communication with the second inlet port of the twin-scroll turbocharger; and a fourth outlet port of the second pair of the four outlet ports is disposed in gas flow communication with the third inlet port of the single-scroll turbocharger.

5. The exhaust manifold including a control valve of claim 3, wherein the first turbocharger is a first twin-scroll turbocharger having a first inlet port and a second inlet port that are both disposed in gas flow communication with the first turbine wheel, wherein the second turbocharger is a second twin-scroll turbocharger having a third inlet port and a fourth inlet port that are both disposed in gas flow communication with the second turbine wheel, and further wherein:

a first outlet port of the first pair of the four outlet ports is disposed in gas flow communication with the first inlet port of the first twin-scroll turbocharger;

a second outlet port of the first pair of the four outlet ports is disposed in gas flow communication with the third inlet port of the second twin-scroll turbocharger;

a third outlet port of the second pair of the four outlet ports is disposed in gas flow communication with the second inlet port of the first twin-scroll turbocharger; and a fourth outlet port of the second pair of the four outlet ports is disposed in gas flow communication with the fourth inlet port of the second twin-scroll turbocharger.

6. The exhaust manifold including a control valve of claim 3, wherein:

the first subset of the plurality of inlet ports and the first pair of the four outlet ports define a first gas flow chamber;

the second subset of the plurality of inlet ports and the second pair of the four outlet ports define a second gas flow chamber; and the second gas flow chamber is distinct from the first gas flow chamber.

7. The exhaust manifold including a control valve of claim 6, wherein:

the first gas flow chamber and the second gas flow chamber comprise separate housings from each other that can be assembled independent of each other.

8. The exhaust manifold including a control valve of claim 6, wherein:

the first gas flow chamber and the second gas flow chamber are conjoined with each other.

9. The exhaust manifold including a control valve of claim 3, wherein the defined number of combustion chambers is four, wherein the four combustion chambers are disposed in an inline configuration, wherein the four combustion chambers have a defined firing sequence, and further wherein:

the first subset of the plurality of inlet ports comprises a first inlet port and a second inlet port, the first and the second inlet ports being disposed in gas flow communication with respective ones of the four combustion chambers having a one-off firing sequence;

the second subset of the plurality of inlet ports comprises a third inlet port and a fourth inlet port, the third and the fourth inlet ports being disposed in gas flow communication with respective other ones of the four combustion chambers having a one-off firing sequence.

10. The exhaust manifold including a control valve of claim 9, wherein the four combustion chambers are disposed in a 1-2-3-4 inline configuration, and wherein the firing sequence is 1-3-4-2.

11. The exhaust manifold including a control valve of claim 3, wherein the defined number of combustion chambers is five, wherein the five combustion chambers are disposed in an inline configuration, wherein the five combustion chambers have a defined firing sequence, and further wherein:

the first subset of the plurality of inlet ports comprises a first inlet port, a second inlet port, and a third inlet port, the first and the second inlet ports being disposed in gas flow communication with respective ones of the five combustion chambers having a one- off firing sequence;

the second subset of the plurality of inlet ports comprises a fourth inlet port and a fifth inlet port, the fourth and fifth inlet ports being disposed in gas flow communication with respective other ones of the five combustion chambers, the fourth and the fifth inlet ports being disposed in gas flow communication with the respective other ones of the five combustion chambers having a one-off firing sequence.

12. The exhaust manifold including a control valve of claim 11, wherein the five combustion chambers are disposed in a 1-2-3-4-5 inline configuration, and wherein the firing sequence is 1-3-5-4-2.

13. The exhaust manifold including a control valve of claim 3, wherein the defined number of combustion chambers is six, wherein the six combustion chambers are disposed in an inline configuration, wherein the six combustion chambers have a defined firing sequence, and further wherein:

the first subset of the plurality of inlet ports comprises a first inlet port, a second inlet port, and a third inlet port, the first, second and third inlet ports being disposed in gas flow communication with respective ones of the six combustion chambers having a one-off firing sequence; and the second subset of the plurality of inlet ports comprises a fourth inlet port, a fifth inlet port, and a sixth inlet port, the fourth, fifth and sixth inlet ports being disposed in gas flow communication with respective other ones of the six combustion chambers having a one-off firing sequence.

14. The exhaust manifold including a control valve of claim 13, wherein the six combustion chambers are disposed in a 1-2-3-4-5-6 inline configuration, and wherein the firing sequence is 1-5-3-6-2-4.

15. The exhaust manifold including a control valve of claim 3, wherein the defined number of combustion chambers is six, wherein the six combustion chambers are disposed in a V-6 configuration, wherein the six combustion chambers have defined firing sequence, and further wherein:

the first subset of the plurality of inlet ports comprises a first inlet port, a second inlet port, and a third inlet port, the first, second and third inlet ports being disposed in gas flow communication with respective ones of the six combustion chambers having a one-off firing sequence; and the second subset of the plurality of inlet ports comprises a fourth inlet port, a fifth inlet port, and a sixth inlet port, the fourth, fifth and sixth inlet ports being disposed in gas flow communication with respective other ones of the six combustion chambers having a one-off firing sequence.

16. The exhaust manifold including a control valve of claim 15, wherein six combustion chambers of the V-6 configuration are arranged in a 1- 3-5 and a 2-4-6 configuration, and wherein the firing sequence is 1-2-3-4-5-6.

17. The exhaust manifold including a control valve of claim 3, wherein the defined number of combustion chambers is eight, wherein the eight combustion chambers are disposed in a V-8 configuration with a 180-degree crank between consecutive exhaust events at each respective one of the eight combustion chambers, wherein the eight combustion chambers have a defined firing sequence, and further wherein:

the first subset of the plurality of inlet ports comprises a first inlet port, a second inlet port, a third inlet port, and a fourth inlet port, the first, second, third and fourth inlet ports being disposed in gas flow communication with respective ones of the eight combustion chambers having a one-off firing sequence; and the second subset of the plurality of inlet ports comprises a fifth inlet port, a sixth inlet port, a seventh inlet port, and an eighth inlet port, the fifth, sixth, seventh and eighth inlet ports being disposed in gas flow communication with respective other ones of the eight combustion chambers having a one-off firing sequence.

18. The exhaust manifold including a control valve of claim 17, wherein the eight combustion chambers of the V-8 configuration are arranged in a 1-3-5-7 and a 2-4-6-8 configuration, and wherein the firing sequence is 1-8-7-2-6-5- 4-3 or 1-8-4-3-6-5-7-2.

19. The exhaust manifold including a control valve of claim 3, wherein the exhaust manifold comprises a first exhaust manifold portion, wherein the defined number of combustion chambers comprises a first four-cylinder portion of an internal combustion engine having eight combustion chambers disposed in a V-8 configuration with a 360-degree crank between consecutive exhaust events at each respective one of the eight combustion chambers, wherein the eight combustion chambers have a defined firing sequence, and further wherein:

the first subset of the plurality of inlet ports comprises a first inlet port and a second inlet port, the first and second inlet ports being disposed in gas flow communication with respective ones of the first four-cylinder portion having a non- sequential firing sequence; and the second subset of the plurality of inlet ports comprises a third inlet port and a fourth inlet port, the third and fourth inlet ports being disposed in gas flow communication with respective other ones of the first four-cylinder portion having a non- sequential firing sequence.

20. The exhaust manifold including a control valve of claim 19, wherein the eight combustion chambers of the V-8 configuration are arranged in a 1-3-5-7 and a 2-4-6-8 configuration, wherein the firing sequence is 1-8-7-2-6-5-4-3 or 1-8-4-3-6-5-7-2, and wherein the first four-cylinder portion comprises either the 2-5-3- 8 cylinder arrangement or the 1-7-6-4 cylinder arrangement.

21. A bifurcated exhaust manifold and control valve for use with a defined number of combustion chambers of an internal combustion engine;

the bifurcated exhaust manifold comprising:

a plurality of inlet ports;

a first gas flow chamber disposed in gas flow communication with a first subset of the plurality of inlet ports; and a second gas flow chamber disposed in gas flow communication with a second subset of the plurality of inlet ports that is distinct from the first subset;

wherein the second gas flow chamber is distinct from the first gas flow chamber;

wherein each gas flow chamber comprises two outlet ports;

the control valve comprising:

at least one seal configured and disposed to selectively receive or not receive exhaust flow from a first of the two outlet ports of the first gas flow chamber and from a first of the two outlet ports of the second gas flow chamber;

a flow passage inlet disposed and adapted to receive exhaust flow from a second of the two outlet ports of the first gas flow chamber and a second of the two outlet ports of the second gas flow chamber via exhaust flow from a first turbine; and at least a first flow passage outlet disposed and adapted to feed the exhaust flow received from the at least one seal, the flow passage inlet, or both the at least one seal and the flow passage inlet, to a second turbine.

22. The exhaust manifold and control valve of claim 1, wherein:

the at least one seal comprises: a first seal configured and disposed to selectively receive or not receive exhaust flow from the one of the first pair of the four outlet ports; and, a second seal configured and disposed to selectively receive or not receive exhaust flow from the one of the second pair of the four outlet ports; and the at least a first flow passage outlet comprises: a first flow passage outlet disposed and adapted to feed the exhaust flow received from the first seal, the flow passage inlet, or both the first seal and the flow passage inlet, to a first inlet port of the second turbine; and, a second flow passage outlet disposed and adapted to feed the exhaust flow received from the second seal, the flow passage inlet, or both the second seal and the flow passage inlet, to a second inlet port of the second turbine.

23. The bifurcated exhaust manifold and control valve of claim 21, wherein:

the at least one seal comprises: a first seal configured and disposed to selectively receive or not receive exhaust flow from the first of the two outlet ports of the first gas flow chamber; and, a second seal configured and disposed to selectively receive or not receive exhaust flow from the first of the two outlet ports of the second gas flow chamber; and the at least a first flow passage outlet comprises: a first flow passage outlet disposed and adapted to feed the exhaust flow received from the first seal, the flow passage inlet, or both the first seal and the flow passage inlet, to a first inlet port of the second turbine; and, a second flow passage outlet disposed and adapted to feed the exhaust flow received from the second seal, the flow passage inlet, or both the second seal and the flow passage inlet, to a second inlet port of the second turbine.

24. A combination useful in a vehicle, the combination comprising:

an internal combustion engine comprising a defined number of combustion chambers;

an exhaust manifold disposed in gas flow communication with the internal combustion engine;

a first turbocharger and a second turbocharger disposed in gas flow communication with the exhaust manifold;

a control valve disposed in gas flow communication between the exhaust manifold and the second turbocharger, and between the first turbocharger and the second turbocharger, the control valve being operable between a closed position that facilitates exhaust gas flow in the exhaust manifold to the first turbocharger, and an open position that facilitates exhaust gas flow in the exhaust manifold to the second turbocharger;

wherein the exhaust manifold comprises:

a plurality of inlet ports; and four outlet ports, wherein a first pair of the four outlet ports are disposed in gas flow communication with a first subset of the plurality of inlet ports, and wherein a second pair of the four outlet ports different from the first pair are disposed in gas flow communication with a second subset of the plurality of inlet ports different from the first subset;

wherein the control valve is further operable in an intermediate position between the closed and open positions to facilitate exhaust flow in the exhaust manifold to both the first and the second turbochargers, the second turbocharger being disposed to receive exhaust flow from the first turbocharger downstream of the control valve.

* * * * *